US00RE40375E

(19) United States
(12) Reissued Patent
Abel et al.

(10) Patent Number: US RE40,375 E
(45) Date of Reissued Patent: Jun. 10, 2008

(54) BACK-END VARIATION CONTROL CAP FOR USE WITH A JACK MODULE

(75) Inventors: John N. Abel, Avon, IN (US); Bryan S. Moffitt, Red Bank, NJ (US); William T. Spitz, McKinney, TX (US); Ronald L. Wild, Albuquerque, NM (US); Timothy C. Miller, McKinney, TX (US)

(73) Assignee: CommScope, Inc. of North Carolina, Hickory, NC (US)

(21) Appl. No.: 11/493,941

(22) Filed: Jul. 26, 2006

(Under 37 CFR 1.47)

Related U.S. Patent Documents

Reissue of:
(64) Patent No.: 6,767,241
Issued: Jul. 27, 2004
Appl. No.: 10/447,181
Filed: May 28, 2003

(51) Int. Cl.
*H01R 4/24* (2006.01)

(52) U.S. Cl. ..... 439/417; 439/540.1; 439/456
(58) Field of Classification Search ..... 439/417, 439/540.1, 676, 404, 456, 395, 719
See application file for complete search history.

(56) References Cited

U.S. PATENT DOCUMENTS

| | | | | |
|---|---|---|---|---|
| 3,459,878 | A | 8/1969 | Gressitt et al. | |
| 3,772,635 | A | 11/1973 | Frey et al. | |
| 5,624,274 | A | 4/1997 | Lin | |
| 6,017,229 | A | 1/2000 | Tulley et al. | |
| 6,267,617 | B1 | 7/2001 | Nozick | 439/417 |
| 6,302,699 | B1 | 10/2001 | Conorich et al. | |
| 6,315,596 | B1 | 11/2001 | Chen | |
| 6,325,671 | B1 | 12/2001 | Radliff | |
| 6,338,643 | B1 | 1/2002 | Miller et al. | 439/417 |
| 6,371,780 | B1 | 4/2002 | Aponte et al. | |
| 6,488,525 | B2 | 12/2002 | Abel et al. | |
| 6,565,375 | B1 | 5/2003 | Daoud et al. | |
| 6,592,395 | B2 | 7/2003 | Brown et al. | |
| 6,592,396 | B2 | 7/2003 | Pepe et al. | 439/417 |
| 6,746,283 | B2 | 6/2004 | Arnett et al. | |
| 6,752,647 | B1 | 6/2004 | Lin | |
| 6,767,241 | B1 | 7/2004 | Abel et al. | |
| 6,830,488 | B2 | 12/2004 | Bush et al. | |
| 6,953,362 | B2 | 10/2005 | Mössner et al. | |
| 7,025,621 | B2 | 4/2006 | Mössner et al. | |
| 2002/0094715 | A1 | 7/2002 | Pepe et al. | |

FOREIGN PATENT DOCUMENTS

| | | |
|---|---|---|
| CA | 2 429 765 A1 | 11/2004 |
| EP | 0 899 827 A2 | 3/1999 |
| EP | 0 982 815 A2 | 3/2000 |

*Primary Examiner*—Tho D. Ta
(74) *Attorney, Agent, or Firm*—Myers Bigel Sibley & Sajovec

(57) ABSTRACT

A back-end variation control cap configured for use with a jack module including a plurality of insulation displacement connectors, the cap being configured for routing a plurality of twisted conductor pairs. The cap includes an upper portion, a bottom portion, a plurality of twisted pair channels extending between the upper portion and the bottom portion, and a pair of opposed end walls, each of the end walls including a plurality of wire constraints disposed thereon. Each wire constraint has opposed surfaces configured to retain one of the conductors and each twisted conductor pair extends through one of the twisted pair channels and the conductors of the twisted conductor pairs are disposed in the plurality of wire constraints such that each conductor is aligned with one of the insulation displacement connectors when the bottom portion is disposed adjacent the jack module.

37 Claims, 5 Drawing Sheets

BACK-END VARIATION CONTROL CAP FOR USE WITH A JACK MODULE

Matter enclosed in heavy brackets [ ] appears in the original patent but forms no part of this reissue specification; matter printed in italics indicates the additions made by reissue.

TECHNICAL FIELD

The present invention generally relates to routing twisted conductor pairs of a cable to a jack module and, in particular, to devices, systems and methods for controlling the consistency with which the twisted conductor pairs are routed.

DESCRIPTION OF THE RELATED ART

As is known, communications patch panels frequently incorporate the use ofjack modules 100, as shown in FIG. 1, that can be readily attached to and removed from the patch panel. Typically, existing jack modules 100 include a housing 102 having a front portion 104 and a back portion 110. The front portion 104 is visible to the user of the patch panel (not shown) and includes one or more jack openings 106 configured to receive a communication connector (not shown). The front portion 104 and the back portion 110 matingly engage each other and serve to protect a printed wiring board 130, one or more jack receptacles 136, and a plurality of insulation displacement connectors 138. The jack receptacles 136 are mounted to the front side 132 of the printed wiring board 130 while the insulation displacement connectors (IDCs) 138 are mounted to the back side 134. Traces (not shown) on the printed wiring board 130 electrically connect the IDCs 138 to the electrical contacts 137 (FIG. 2) housed within the jack receptacles 136. As assembled, each jack receptacle 136 aligns with a jack opening 106 in the front portion 104 of the housing while the IDCs 138 are aligned with a terminal connection region 112 disposed on the back portion 110. As shown, the front portion 104 and the back portion 110 of the housing are held together with assembly tabs 108 on the front portion that engage assembly notches 109 on the back portion 110.

FIG. 2 shows a front view of the jack module 100, as would be seen by a user of a typical communications patch panel. FIGS. 3 and 4 show the terminal connection region 112 in greater detail. As shown in FIG. 4, the terminal connection region 112 consists of two substantially parallel rows 114 of wire guide posts 116 and wire guide splitters 117, alternatingly disposed along each row 114. As best seen in FIG. 3, adjacent wire guide posts 116 and wire guide splitters 117 have a terminal slot 118 disposed therebetween. Each terminal slot 118 allows access to one of the IDCs 138 disposed within the parallel rows 114. Physical and electrical contact is made between a conductor (not shown) and an IDC 138 by urging the conductor into the terminal slot 118 until the conductor passes between the opposed portions of the IDCs contact tail 139 FIG. 1). Opposed portions of the contact tail 139 cut through insulation disposed around the conductor, thereby making electrical contact.

Referring now to FIG. 4, the manner of electrically connecting a cable including a plurality of twisted pairs to an existing jack module 100 is addressed. First, a technician determines which IDCs 138 are associated with the desired jack receptacle 136. Here, the IDCs 138 of interest are accessed by way of the pairs of terminal slots labeled 118a, 118b, 118c, and 118d, each of the pairs of the terminal slots 118 being configured to receive the conductors from one of the cable's twisted conductor pairs. Once the desired IDCs 138 have been determined, the technician urges the desired conductor into the appropriate IDC, typically using a device such as a punch-down tool (not shown). As shown, one twisted pair would be inserted into each pair of terminal slots 118A-D. The wire guide splitters 117 assist the technician in separating the conductors of each twisted conductor pair, thereby making it easier for the technician to insert the desired conductor into the desired IDC 138.

Such methods of routing twisted pairs on the back of existing jack modules 100 have proved adequate for existing performance levels. This is because in the past variation of the routing of twisted pairs, from pair to pair, has had little effect if any on performance. However, recent developments, such as patch panels requiring category 6 performance levels, are much more sensitive to variations in twisted pair dress and routing.

Therefore, there is a need for improved devices, systems and methods that address variations in twisted pair dress and routing and/or other shortcomings of the prior art.

SUMMARY

Briefly described, the present invention relates to devices, systems and methods for reducing variations in how twisted pairs from a communications cable are routed to jack modules. In this regard, a preferred embodiment of a back-end variation control cap is configured for use with a jack module including a plurality of insulation displacement connectors, and the cap is configured for routing a plurality of twisted conductor pairs. The cap includes an upper portion, a bottom portion, a plurality of twisted pair channels extending between the upper portion and the bottom portion, and a pair of opposed end walls, each of the end walls including a plurality of wire constraints disposed thereon. Each wire constraint has opposed surfaces configured to retain one of the conductors and each twisted conductor pair extends through one of the twisted pair channels and the conductors of the twisted conductor pairs are disposed in the plurality of wire constraints such that each conductor is aligned with one of the insulation displacement connectors when the bottom portion is disposed adjacent the jack module.

Another embodiment of the present invention provides a method of routing twisted conductor pairs from a cable onto a jack module including insulation displacement connectors. The method includes the steps of: providing a cap having a top portion and a bottom portion; passing each of the twisted conductor pairs through the cap from the top to the bottom portion; engaging a portion of the cap with each of the conductors such that each conductor is immobilized; and disposing the cap on the jack module such that the bottom portion is adjacent the jack module and each of the conductors electrically engages one of the insulation displacement connectors.

Another embodiment of the present invention provides a jack module system configured to receive a plurality of twisted conductor pairs and at least one communication connector. The system includes a housing having a front portion including a jack opening configured to receive the communication connector and a back portion including a terminal connection region configured to receive the twisted pair conductors. A jack receptacle, a printed wiring board, and a plurality of insulation displacement connectors are disposed within the housing such that the jack receptacle is aligned with the jack opening and the plurality of insulation displacement connectors are accessible through the terminal connection region. The jack receptacle and the plurality of insulation displacement connectors are disposed on opposite sides of the printed wiring board. The system further includes a back-end variation control cap including an upper portion, a bottom portion, a plurality of twisted pair channels extending between the upper and the bottom portions, and a plurality of wire constraints disposed on the bottom portion, wherein each wire constraint is configured to retain one of the conductors. Each twisted conductor pair extends through one of the twisted pair channels and the conductors are disposed in the plurality of wire constraints such that each conductor is aligned with one of the insulation displacement connectors when the bottom portion slidably engages the terminal connection region.

Other features and/or advantages of the present invention will be or may become apparent to one with skill in the art upon examination of the following drawings and detailed description. It is intended that all such features and/or advantages be included herein within the scope of the present invention, as defined in the appended claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 5A:
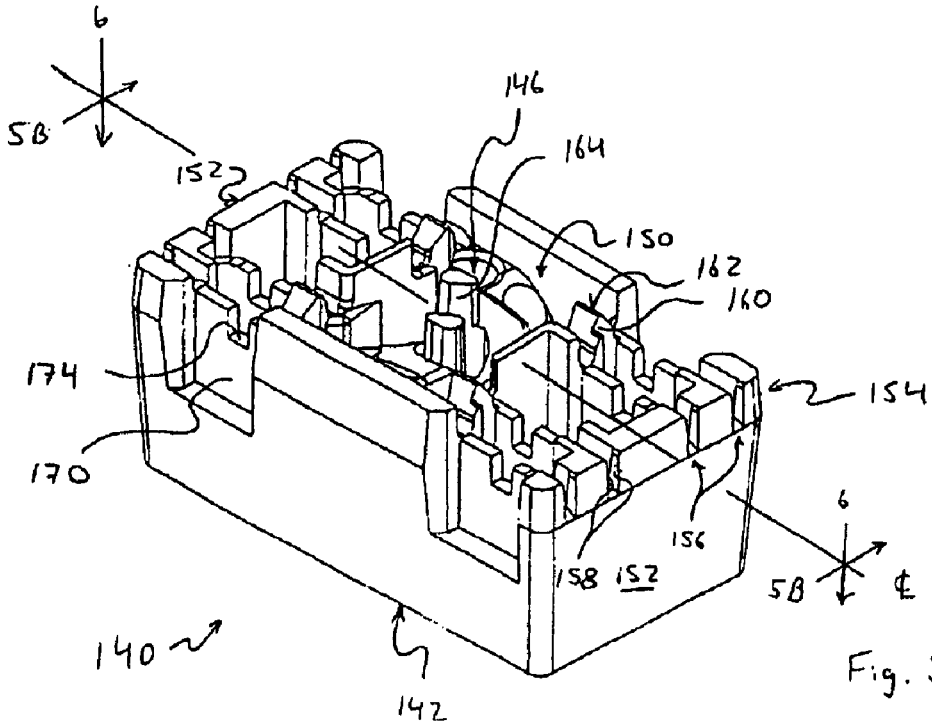
FIG. 5A is a top perspective view of an embodiment of a back-end variation control cap shown in an inverted position.
Figure 7:
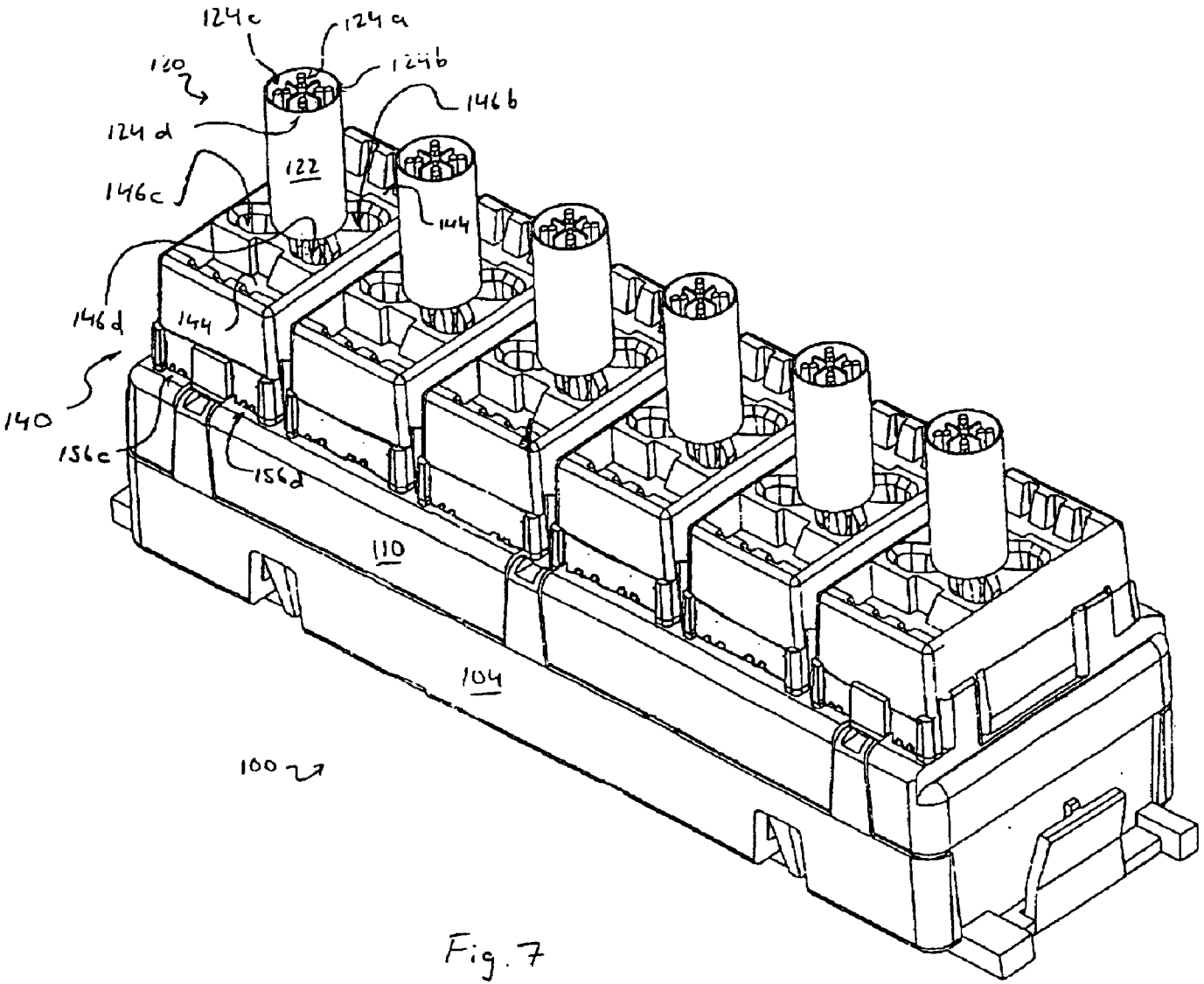
FIG. 7 is a top perspective view of the embodiment of the back-end variation control cap of FIG. 5A, as shown in FIGS. 5A-B, mounted to an embodiment of a jack module.

Reference will now be made to the drawings wherein like numerals indicate corresponding parts throughout the several views. As shown in FIG. 5A, an embodiment of a back-end variation control cap 140 is shown in an inverted position. The back-end variation control cap 140 includes an upper portion 142 and a bottom portion 150, with a plurality of twisted pair channels 146 connecting the upper portion 142 and the bottom portion 150. Preferably, each twisted pair channel 146 is configured to receive a twisted conductor pair 124 from a communications cable 120, as shown in FIG. 7. This particular embodiment includes four twisted pair channels 146 is for use with a communications cable 120 that includes four twisted conductor pairs 124 housed within a cable jacket 122.

Figure 6D:
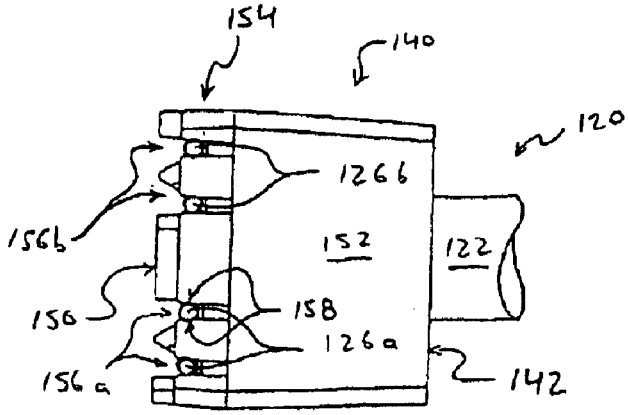
FIG. 6D is an end view of an embodiment of the back-end variation control cap of FIG. 5A, as shown in FIGS. 6A-6C.
Figure 6A:
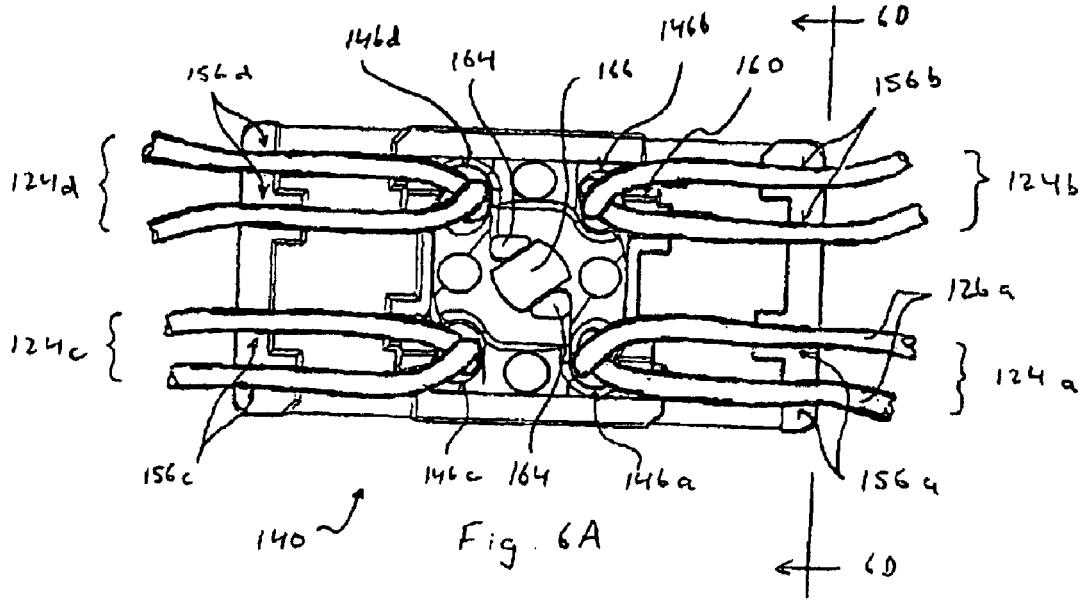
FIG. 6A is a bottom view of the embodiment of the back-end variation control cap of FIG. 5A, taken along line 6-6 of FIG. 5A, showing details of twisted pair routing.

Referring now to FIG. 6A, the bottom portion 150 of the back-end variation control cap 140 includes a plurality of wire constraints 156 disposed along the bottom edges 154 of a pair of opposed end walls 152. Preferably, each wire constraint 156 is configured to frictionally engage an individual conductor 126 from a twisted conductor pair 124 (FIG. 5C). In the embodiment shown, this is accomplished by providing a pair of opposed surfaces 158 that are separated by a distance that is slightly less than the outer diameter of each conductor 126. The bottom portion 150 also includes a plurality of twisted pair splitters 160. Preferably, each twisted pair splitter 160 includes a pointed, or knife-like, ridge 162 that allows a technician to separate the individual conductors 126 within each twisted conductor pair 124. A twisted pair splitter 160 is disposed on the bottom portion 150 adjacent each of the twisted pair channels 146. Therefore, in the embodiment shown, there are four twisted pair splitters 160. A pair of routing posts 164 are centrally located on the bottom portion 150. The routing posts 164 assist a technician to route the conductors 126 in a desired fashion.

Figure 1:
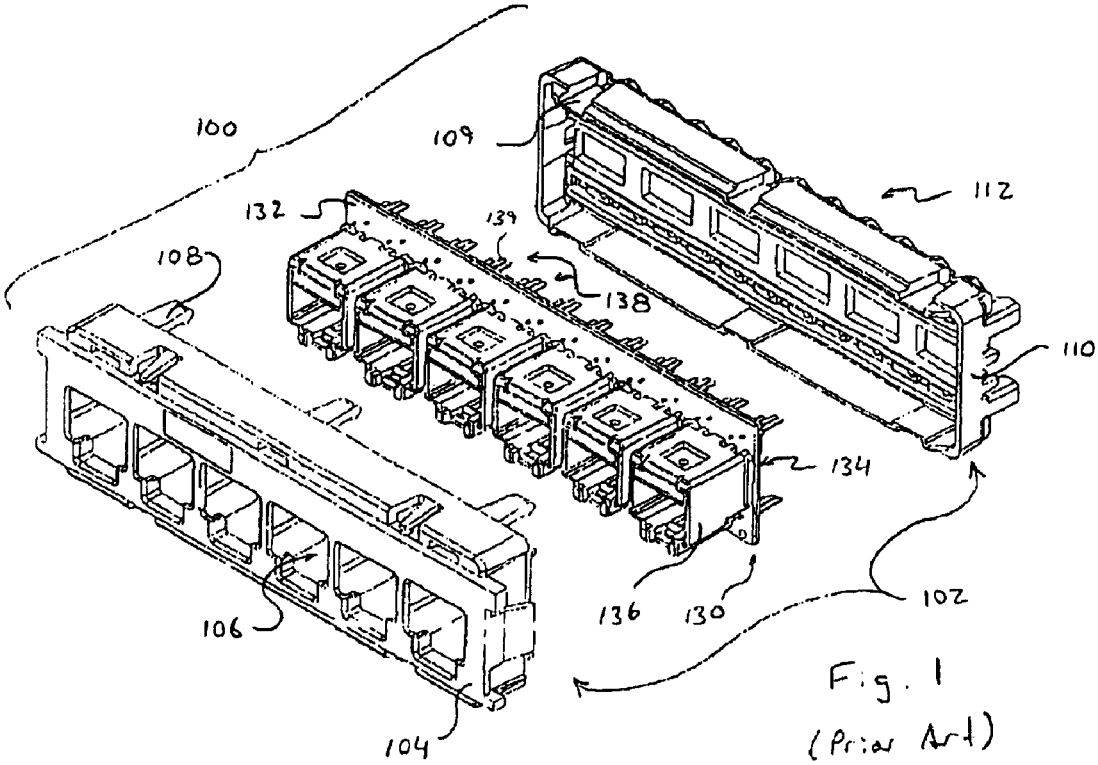
Fig. 1 (Prior Art)
FIG. 1 is an exploded, perspective view of a prior art jack module.
Figure 2:
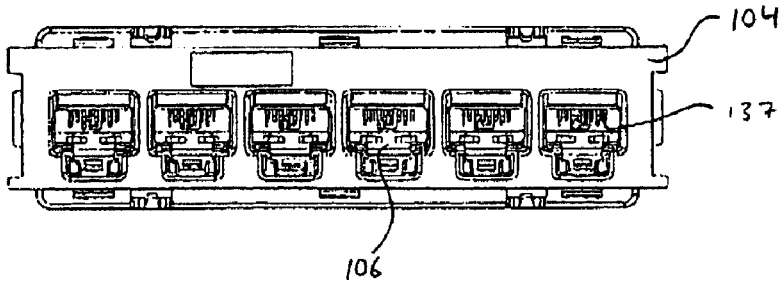
Fig. 2 (Prior Art)
FIG. 2 is a front elevational view of the jack module as shown in FIG. 1.
Figure 3:
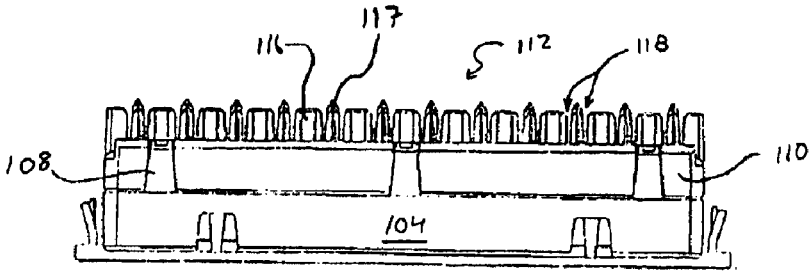
Fig. 3 (Prior Art)
FIG. 3 is a top view of the jack module as shown in FIG. 1.
Figure 5B:
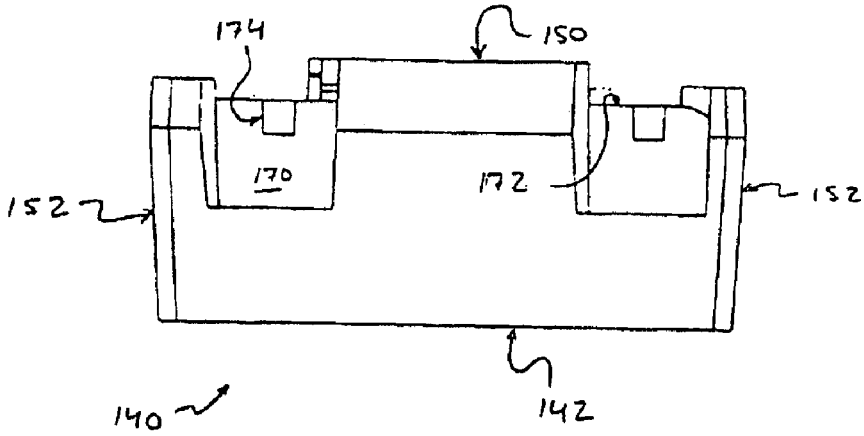
FIG. 5B is a side view of the embodiment of the back-end variation control cap of FIG. 5A, taken along line 5B-5B of FIG. 5A.

A plurality of punch-down walls 170 also are included. One punch-down wall 170 is provided for each conductor 126 that is to be routed within the back-end variation control cap 140. Preferably, the punch-down walls 170 are disposed in substantially parallel pairs, each pair including a punch-down wall 170 disposed on opposing sides of each twisted pair splitter 160 and extending to an associated wire constraint 156. Preferably, as shown in FIG. 5A, the punch down walls 170 are substantially parallel to the longitudinal center line of the back-end variation control cap 140 and are disposed such that two pairs of the punch-down walls 170 are on opposed sides of the center line. As shown in FIG. 5B, each punch-down wall 170 includes a notch 174 which is configured to prevent excessive force from being applied to the portion of each conductor 126 that is being engaged with its associated IDC 138 (FIG. 1).

In Operation

As previously noted, the embodiment shown is configured for use with a standard communications cable 120 that includes a cable jacket 122 and four twisted conductor pairs 124, as shown in FIG. 7. For ease of description, the four twisted conductor pairs are designated 124a, 124b, 124c and 124d.

During use, each twisted conductor pair 124a-d is routed through the corresponding twisted pair channel 146a-d, as shown in FIG. 7. The twisted conductor pairs 124a-d are pulled through the twisted pair channels 146a-d until the cable jacket 122 abuts the upper portion 142 of the back-end variation control cap 140. Next, as shown in FIG. 6A, the individual conductors 126 of each twisted conductor pair 124a-d are separated using the twisted pair splitters 160. The twisted pair splitters 160 facilitate separation of the typically small diameter conductors 126. As well, the twisted pair splitters 160 help ensure that the conductors 126 of each twisted conductor pair 124a-d remain uniformly parallel to each other as the conductors 126 extend outwardly toward the wire constraints 156, thereby helping to insure uniformity in the manner of routing of the twisted conductor pairs 124a-d.

For ease of description, reference will now be made only to twisted conductor pair 124a. After the conductors 126a of twisted conductor pair 124a have been separated at the twisted pair splitter 160, each conductor 126a is extended outwardly toward a corresponding wire constraint 156a. The conductors 126a are disposed adjacent the bottom ledge 172 of an associated punch-down wall 170 (FIG. 5B). After the conductors 126a have been routed along the punch-down walls 170, the conductors 126a are frictionally restrained by the wire constraints 156a, thereby maintaining the conductors 126a in the desired routing positions. As well, by frictionally engaging the conductors 126a with the wire constraints 156a, the communications cable 120 is held in place such that the cable jacket 122 remains adjacent the upper portion 142 of the back-end variation control cap 140. By repeating the above steps discussed with regard to twisted conductor pair 124a for twisted conductor pairs 124b-d, the twisted conductor pair routing arrangement as shown in FIG. 6A is achieved. FIG. 6D is a view of the back-end variation control cap 140 taken along line 6D-D of FIG. 6A. Note, conductors 126a are retained within wire constraints 156a and conductors 126b are retained within wire constraints 156b.

Figure 4:
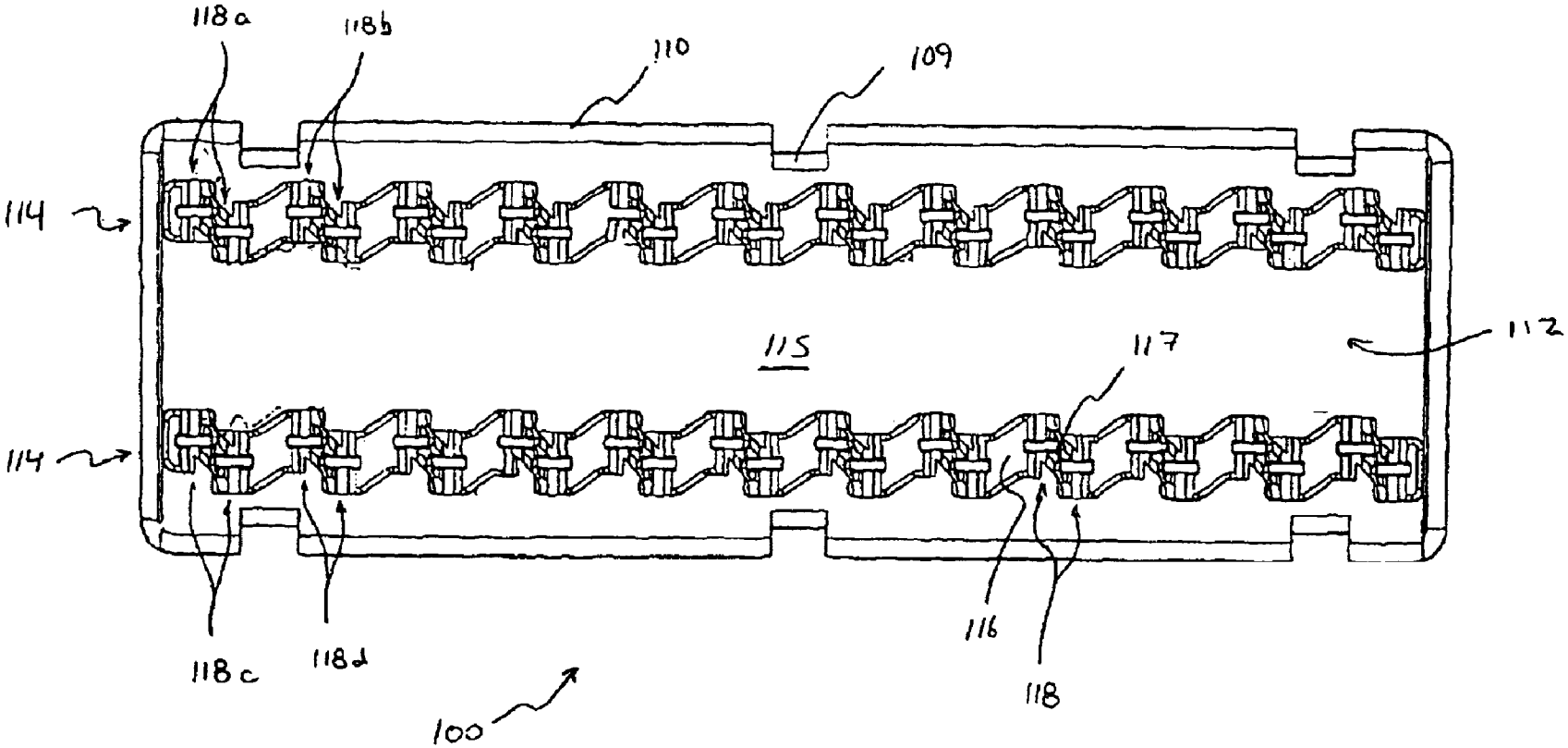
Fig. 4 (Prior Art)
FIG. 4 is a back view of the jack module as shown in FIG. 1.

After the twisted conductor pairs 124a-d have been routed as desired, the back-end variation control cap 140 is positioned above the back portion 110 of the jack module, see, for example, jack module 100 (FIG. 4), such that the twisted conductor pairs 124a-d are aligned with the appropriate terminal slots 118. For the routing configuration shown in FIG. 6A, when the back-end variation control cap 140 is properly aligned with the back portion 110, the twisted conductor pairs 124a-d will be aligned with the terminal slots 118a-d, respectively. The back-end variation control cap 140 is then urged into position adjacent the back portion 110 by engaging the punch-down tool sockets 144 (FIG. 7) with a punch-down tool (not shown). As the back-end variation control cap 140 is urged into position adjacent the back portion 110, the conductors 126 of the twisted conductor pairs 124a-d are urged downwardly through the terminal slots 118a-d and into both physical and electrical contact with the contact tails 139 of the IDCs 138 (FIG. 1). FIG. 7 shows the back--end variation control cap 140 as assembled to jack module 100. Preferably, the bottom portion 150 of the back-end variation control cap 140 is configured such that the wire guide posts 116 and wire guide splitters 117 nest therein. Note, physical contact between the conductors 126 and the IDCs 138 maintain the back-end variation control cap 140 in the desired position adjacent the jack module in this embodiment.

Figure 6B:
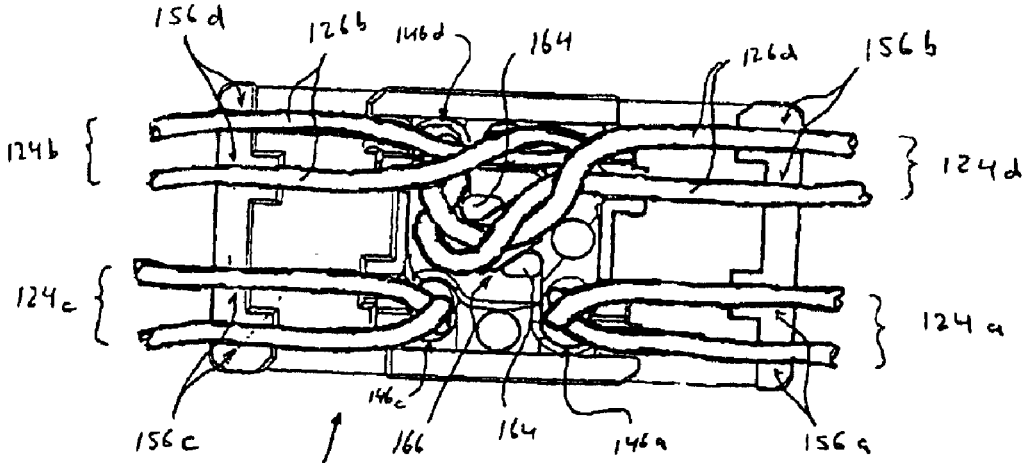
FIG. 6B is a bottom view of the embodiment of the back-end variation control cap of FIG. 5A, taken along line 6-6 of FIG. 5A, showing details of twisted pair routing.
Figure 6C:
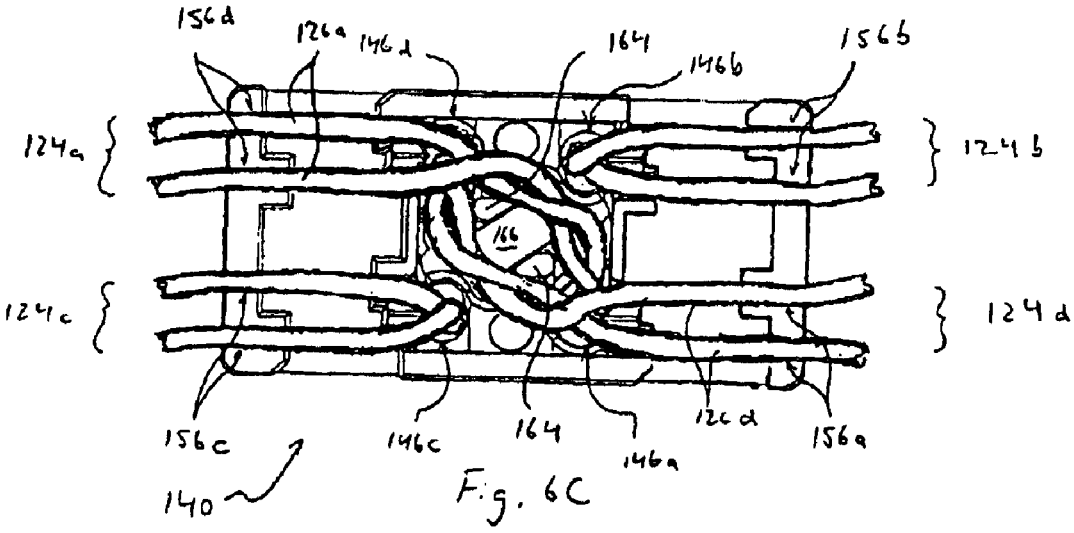
FIG. 6C is a bottom view of the embodiment of the back-end variation control cap of FIG. 5A, taken along line 6-6 of FIG. 5A, showing details of twisted pair routing.

As shown in FIG. 6B and FIG. 6C, multiple routing options are possible for the twisted conductor pairs 124a-d. FIG. 6B discloses an arrangement wherein adjacent twisted conductor pairs 124b and 124d crossover one another. This arrangement is achieved by routing the twisted conductor pairs 124a-d through the associated twisted pair channels 146a-d, respectively. Next, twisted conductor pairs 124a and 124c are routed to their respective pairs of wire constraints 156a and 156c. To achieve crossover between adjacent twisted conductor pairs 124b and 124d, twisted conductor pair 124b is routed to the twisted pair splitter 160 that is disposed adjacent twisted pair channel 146d. Once twisted conductor pair 124b has been separated with the twisted pair splitter 160, the conductors 126b are routed to wire constraints 156d and are frictionally engaged therein. To complete the adjacent crossover arrangement, twisted conductor pair 124d is routed through a gap 166 disposed between the routing posts 164. The twisted conductor pair 124d is separated into individual conductors 126d with the twisted pair splitter 160 that is disposed adjacent twisted pair channel 146b. The conductors 126d are then routed to and secured in the wire constraints 156b. Once the twisted conductor pairs 124a-d have been arranged and secured within the back-end variation control cap 140, the cap is ready for installing on the jack module 100 in the manner previously discussed with regard to FIG. 6A. Once assembled, this routing arrangement results in twisted conductor pairs 124b and 124d being inserted into terminal slots 118d and 118b, respectively.

FIG. 6C discloses an arrangement in which twisted conductor pairs 124a and 124d which are disposed diagonally to each other within the communications cable 120 are routed in a crossover fashion. To achieve this configuration, twisted conductor pairs 124b and 124c are separated into pairs of substantially parallel conductors 126 and secured within their respective wire constraints 156b and 156c. Next, twisted conductor pair 124a is routed around the centrally disposed routing posts 164 and are separated into conductors 126a with the aid of twisted pair splitter 160 disposed adjacent to twisted pair channel 146d. The conductors 126a are then extended outwardly in a substantially parallel fashion and are secured within wire constraints 156d. Similarly, twisted conductor pair 124d is routed around the centrally located routing posts 164 opposite twisted conductor pair 124a. Twisted conductor pair 124d is separated into conductors 126d with the assistance of twisted pair splitter 160 which is disposed adjacent twisted pair channel 146a. The conductors 126d are then extended outwardly in a substantially parallel manner and engaged within wire constraints 156a. With the twisted conductor pairs 124a-d so arranged, the back-end variation control cap 140 is in condition for mounting to the jack module 100. The routing arrangement shown in FIG. 6C results in twisted conductor pairs 124a and 124da being inserted into terminal slots 118d and 118a, respectively.

The foregoing description has been presented for purposes of illustration and description. It is not intended to be exhaustive or to limit the invention to the precise forms disclosed. Modifications and/or variations are possible in light of the above teachings. The embodiments discussed, however, were chosen and described to illustrate the principles of the invention and its practical application to thereby enable one of ordinary skill in the art to utilize the invention and various embodiments and with various modifications as are suited to the particular use contemplated. All such modifications and/or variations are within the scope of the invention as determined by the appended claims when interpreted in accordance with the breadth to which they are fairly and legally entitled.

Therefore, having thus described the invention, at least the following is claimed:

1. A back-end variation control cap for use with a jack module including a plurality of insulation displacement connectors, the back-end variation control cap being configured for routing a plurality of twisted conductor pairs, said back-end variation cap comprising:

an upper portion;

a bottom portion spaced from the upper portion;

a plurality of twisted pair channels extending between the upper portion and the bottom portion;

a pair of opposed end walls, each of the end walls including a plurality of wire constraints disposed thereon, each wire constraint having opposed surfaces configured to retain one conductor of the plurality of twisted conductor pairs;

a plurality of twisted pair splitters, each twisted pair splitter extending downwardly from the bottom portion adjacent a different one of the twisted pair channels, each twisted pair splitter being configured to facilitate separating the conductors of one of the twisted pairs; and wherein each of the twisted pair channels is sized and shaped to receive a respective one of the twisted conductor pairs such that, when retained by respective wire constraints, each conductor is aligned with one of the insulation displacement connectors.

2. The cap of claim 1, wherein each of the opposed end walls further includes a bottom edge, each of the wire constraints is disposed along one of the bottom edges, and wherein each twisted pair splitter is further disposed between the twisted pair channel and the nearest of the opposed sidewalls.

3. The cap of claim 1, further comprising a pair of punch-down walls extending longitudinally from each of the twisted pair channels toward a pair of the wire constraints, wherein each punch-down wall includes a bottom ledge configured to urge one of the conductors into one of the insulating displacement connectors.

4. The cap of claim 3, wherein the punch-down walls of each pair are disposed on opposing sides of an associated twisted pair splitter, and the lower most portion of the twisted pair splitter is substantially knife-like.

5. A method of routing twisted conductor pairs from a cable onto a jack module including insulation displacement connectors, comprising the steps of:

providing a cap having a top portion and a bottom portion;

passing each of the twisted conductor pairs [through the cap] from the top portion to the bottom portion;

routing at least a first twisted conductor pair and a second twisted conductor pair such that the first and second twisted conductor pairs cross over one another on the bottom portion, the first and second twisted conductor pairs being adjacent within the cable;

engaging a portion of the cap with each of the conductors such that each conductor is retained; and disposing the cap on the jack module such that the bottom portion is adjacent the jack module and each of the conductors electrically engages one of the insulation displacement connectors.

6. The method of claim 5, further comprising the step of splitting each of the twisted conductor pairs prior to the engaging step such that the conductors of each pair are substantially parallel along the bottom portion.

7. The method of claim 5, wherein the engaging step further comprises press fitting the conductors into wire constraints, thereby frictionally engaging the conductors.

8. A method of routing twisted conductor pairs from a cable onto a jack module including insulation displacement connectors, comprising the steps of:

providing a cap having a top portion and a bottom portion;

passing each of the twisted conductor pairs [through the cap] from the top portion to the bottom portion;

routing at least a first twisted conductor pair and a second twisted conductor pair such that the first and second twisted conductor pair cross over one another on the bottom portion, the first and second twisted conductor pairs being diagonally disposed within the cable;

engaging a portion of the cap with each of the conductors such that each conductor is retained; and disposing the cap on the jack module such that the bottom portion is adjacent the jack module and each of the conductors electrically engages one of the insulation displacement connectors.

9. A jack module system configured to receive a plurality of twisted conductor pairs and at least one communication connector, comprising:

a housing having a front portion including a jack opening configured to receive the communication connector and a back portion including a terminal connection region configured to receive the twisted pair conductors;

a jack receptacle, a printed wiring board, and a plurality of insulation displacement connectors disposed within the housing such that the jack receptacle is aligned with the jack opening and the plurality of insulation displacement connectors are accessible through the terminal connection region, the jack receptacle and the plurality of insulation displacement connectors being disposed on opposite sides of the printed wiring board;

a back-end variation control cap comprising:

an upper portion;

a bottom portion; a plurality of twisted pair channels extending between the upper and the bottom portions;

a plurality of wire constraints disposed on the bottom portion, each wire constraint being configured to retain one of the conductors; a twisted pair splitter depending downwardly from the bottom portion adjacent each of the twisted pair channels, each twisted pair splitter including a pointed ridge configured to facilitate separating the conductors of the twisted pairs; and wherein each twisted conductor pair extends through one of the twisted pair channels and the conductors are disposed in the plurality of wire constraints such that each conductor is aligned with one of the insulation displacement connectors when the bottom portion slidably engages the terminal connection region.

10. The jack module system of claim 9, wherein the terminal connector region further comprises two substantially parallel rows housing the plurality of insulation displacement connectors.

11. The jack module system of claim 9, wherein the back-end variation control cap further comprises a pair of opposed end walls, each of the end walls including two pair of wire restraints.

12. The jack module system of claim 11, wherein the plurality of twisted pair channels further comprises four twisted pair channels.

13. A jack module system configured to receive a plurality of twisted conductor pairs and at least one communication connector, comprising:

a housing having a front portion including a jack opening configured to receive the communication connector and a back portion including a terminal connection region configured to receive the twisted pair conductors;

a jack receptacle, a printed wiring board, and a plurality of insulation displacement connectors disposed within the housing such that the jack receptacle is aligned with the jack opening and the plurality of insulation displacement connectors are accessible through the terminal connection region, the jack receptacle and the plurality of insulation displacement connectors being disposed on opposite sides of the printed wiring board;

a back-end variation control cap comprising: an upper portion; a bottom portion; four twisted pair channels extending between the upper and the bottom portions, the four twisted pair channels defining a rectangle therebetween; a plurality of wire constraints disposed on the bottom portion, each wire constraint being configured to retain one of the conductors;

at least one routing post extending downwardly from the bottom portion, the at least one routing post being disposed in the rectangle defined by the four twisted pair channels; and wherein each twisted conductor pair extends through one of the twisted pair channels and the conductors are disposed in the plurality of wire constraints such that each conductor is aligned with one of the insulation displacement connectors when the bottom portion slidably engages the terminal connection region.

14. A back-end variation control cap for use with a jack module including a plurality of insulation displacement connectors, the back-end variation control cap being configured for routing a plurality of twisted conductor pairs, said back-end variation cap comprising:

an upper portion;

a bottom portion spaced from the upper portion;

a plurality of twisted pair channels extending between the upper portion and the bottom portion;

a pair of opposed end walls, each of the end walls including a plurality of wire constraints disposed thereon, each wire constraint having opposed surfaces configured to retain one conductor of the plurality of twisted conductor pairs;

a plurality of punch-down walls, each of the punch-down walls including a proximal end adjacent one of the twisted pair channels and a distal end adjacent one of the wire constraints, and each of the punch-down walls is configured to urge an associated wire conductor into electrical contact with an associated insulation displacement connector; and wherein each of the twisted pair channels is sized and shaped to receive a respective one of the twisted conductor pairs such that, when retained by respective wire constraints, each conductor is aligned with one of the insulation displacement connectors.

15. The cap of claim 14, further comprising a twisted pair splitter disposed adjacent each of the twisted pair channels and extending downwardly from the bottom portion, each twisted pair splitter being configured to facilitate separating the conductors of the twisted conductor pairs, wherein the plurality of punch-down walls further comprises a pair of punch-down walls extending from each of the twisted pair channels, the punch-down walls of each pair being disposed on opposing sides of an associated splitter.

16. A back-end variation control cap for use with a jack module including a plurality of insulation displacement connectors, the back-end variation control cap being configured for routing a plurality of twisted conductor pairs, said back-end variation cap comprising:

an upper portion;

a bottom portion spaced from the upper portion;

a plurality of twisted pair channels extending between the upper portion and the bottom portion;

a pair of opposed end walls, each of the end walls including a plurality of wire constraints disposed thereon, each wire constraint having opposed surfaces configured to retain one conductor of the plurality of twisted conductor pairs;

four twisted pair channels; at least one routing post extending downwardly from the bottom portion, the at least one routing post being disposed within a rectangle defined by the twisted pair channels; and wherein each of the twisted pair channels is sized and shaped to receive a respective one of the twisted conductor pairs such that, when retained by respective wire constraints, each conductor is aligned with one of the insulation displacement connectors.

17. The cap of claim 16, wherein the at least one routing post further comprises a pair of routing posts including a routing gap disposed therebetween, the routing gap being configured to receive at least one twisted conductor pair therein.

*18. A method of routing conductors of a plurality of conductor pairs from a jacketed cable to respective ones of a plurality of contacts of a jack module, the method comprising:*

*providing a cap having a plurality of twist separation points;*

*routing the conductors of each conductor pair along the cap, wherein each conductor pair is routed through a respective one of the plurality of twist separation points;*

*maintaining the wires of each conductor pair in a twisted configuration on a cable side of each respective twist separation point;*

*untwisting the wires of each conductor pair on a contact side of each respective twist separation point;*

*routing a first of the conductor pairs and a second of the conductor pairs such that the first and second twisted conductor pairs cross over one another;*

*mounting the cap on a dielectric housing of the jack module that houses the plurality of contacts; and*

*electrically connecting each of the conductors to a respective one of the contacts.*

*19. The method of claim 18, wherein the first and second of the conductor pairs are adjacent within the cable.*

*20. The method of claim 18, wherein the first and second of the conductor pairs are diagonally disposed within the cable.*

*21. The method of claim 18, wherein the cap further includes a plurality of channels that each route at least one of the conductor pairs from a first side of the cap to a second side of the cap, and wherein the conductors of each conductor pair are twisted as they pass through their respective channel.*

*22. The method of claim 21, wherein a first of the conductor pairs passes through one of the plurality of channels that is adjacent a first pair of the plurality of contacts, and wherein the conductors of the first of the conductor pairs electrically engage a second pair of the plurality of contacts.*

*23. The method of claim 18, wherein the cap is configured to control the routing of each conductor along its respective path from an end of the cable jacket to an end of the conductor.*

*24. The method of claim 18, wherein the dielectric housing of the jack module encases a wire connection end of each of the plurality of contacts, and wherein the dielectric housing of the jack module includes a plurality of terminal slots that provide wire connection access to respective ones of the plurality of contacts.*

*25. The method of claim 18, wherein the cap further includes a plurality of channels that each receive at least one of the conductor pairs, wherein a first of the conductor pairs passes through a first of the plurality of channels that is adjacent first and second of the plurality of contacts and a second of the conductor pairs passes through a second of the plurality of channels that is adjacent third and fourth of*

*the plurality of contacts, and wherein the conductors of the first of the conductor pairs electrically engage, respectively, the third and fourth of the plurality of contacts.*

*26. The method of claim 25, wherein the conductors of the second of the conductor pairs electrically engage, respectively, the first and second of the plurality of contacts.*

*27. The method of claim 18, wherein the dielectric housing of the jack module includes a plurality of wire guide posts and a plurality of wire guide splitters, and wherein the wire guide posts and the wire guide splitters within a bottom side of the cap.*

*28. The method of claim 23, the method further comprising inserting a portion of each conductor in a respective one of a plurality of wire constraints provided on the cap, wherein each of the wire constraints comprises a pair of opposed surfaces that are separated by a distance that is slightly less than the outer diameter of each of the conductors.*

*29. The method of claim 18, wherein at least some of the twist separation points comprise a projection that has a point or ridge on its distal end.*

*30. A back-end variation control cap for a connector jack module, the back-end variation control cap comprising:*

*a top side;*

*a bottom side;*

*a plurality of openings extending through the top side to the bottom side, wherein each of the openings is configured to receive at least one of a plurality of pairs of conductors that are twisted together as the conductors pass through the opening; and*

*a plurality of twist separation structures on the control cap, wherein each of the twist separation structures is configured to define a point where the conductors of one of the plurality of pairs of conductors transition from a twisted configuration to an untwisted configuration,*

*wherein the control cap is configured to mate with a dielectric contact housing of the connector jack module.*

*31. The back-end variation control cap of claim 30, further comprising a plurality of routing channels on the bottom side of the control cap that are each configured to route one or both conductors of a pair of conductors.*

*32. The back-end variation control cap of claim 30, wherein the plurality of twist separation structures are provided on the bottom side of the control cap.*

*33. The back-end variation control cap of claim 30, wherein the dielectric contact housing encases a wire connection end of each of a plurality of insulation displacement contacts, and wherein the dielectric contact housing includes a plurality of terminal slots that provide wire connection access to respective of the plurality of insulation displacement contacts.*

*34. The back-end variation control cap of claim 30, the control cap further comprising a plurality of wire constraints, wherein each of the wire constraints comprises a pair of opposed surfaces that are separated by a distance that is slightly less than the outer diameter of each of the conductors.*

*35. The back-end variation control cap of claim 30, wherein the dielectric contact housing includes a plurality of wire guide posts and a plurality of wire guide splitters, and wherein the wire guide posts and the wire guide splitters nest within a bottom side of the control cap.*

*36. The back-end variation control cap of claim 30, the control cap further comprising at least one routing post that is configured to allow crossing two of the plurality of pairs of conductors.*

*37. A method of routing a plurality of twisted conductor pairs from a cable onto a jack module including insulation displacement connectors, the method comprising:*

*passing each of the plurality of twisted conductor pairs from a first side of the cap to a second side of a cap;*

*routing at least a first of the plurality of twisted conductor pairs and a second of the plurality of twisted conductor pairs such that the first twisted conductor pair crosses the second twisted conductor pair along the cap; and*

*mounting the cap on the jack module such that the second side of the cap is adjacent the jack module and each of the conductors electrically engages one of the insulation displacement connectors.*

* * * * *